(12) United States Patent
Durnen (10) Patent No.: US 6,672,178 B2
(45) Date of Patent: Jan. 6, 2004

(54) ADJUSTABLE AUTOMOTIVE GAUGE MOUNTING CUP WITH INTERCHANGEABLE PEDESTALS

(76) Inventor: Mike Durnen, 4717 N. Larch, Spokane, WA (US) 99216

(*) Notice: Subject to any disclaimer, the term of this patent is extended or adjusted under 35 U.S.C. 154(b) by 0 days.

(21) Appl. No.: 10/243,533

(22) Filed: Sep. 13, 2002

(65) Prior Publication Data

US 2003/0110873 A1 Jun. 19, 2003

Related U.S. Application Data (60) Provisional application No. 60/339,384, filed on Dec. 13, 2001.

(51) Int. Cl.⁷ .............................................. G01D 21/00
(52) U.S. Cl. ...................... 73/866.5; 73/431; D10/102
(58) Field of Search ............................. 73/866.5, 866.3, 73/499, 431; 248/27.1; D10/102

(56) References Cited

U.S. PATENT DOCUMENTS 4,638,666 A * 1/1987 Wong et al. ................... 73/431

OTHER PUBLICATIONS

VDO Performance Instruments Catalog, #0531060188 Jun. 2001, p. 23.

Auto Meter 2002 New Products Preview, Oct. 18, 2001, p. 7.

* cited by examiner

*Primary Examiner*—Richard A. Moller
(74) *Attorney, Agent, or Firm*—Clifford Kraft (57) ABSTRACT

An adjustable gauge mounting cup with interchangeable mounting pedestals that provide a maximum number of mounting locations within a vehicle. The gauge mounting cup allows the operator to easily adjust the viewing angle of the gauge after the cup is mounted in the vehicle. The cup can also have replaceable mounts that have various types of mounting footprints and sizes. The gauge mounting cup mounts on a ball and socket or other adjustable mounting means. This allows the cup to be swiveled on three axes after the base pedestal is mounted and also allows the cup to be moved forward and backward on the pedistal mount.

20 Claims, 8 Drawing Sheets

ADJUSTABLE AUTOMOTIVE GAUGE MOUNTING CUP WITH INTERCHANGEABLE PEDESTALS

This application is related to U.S. Provisional application No. 60/339,384 filed on Dec. 13, 2001 and derives priority from that application. Provisional application No. 60/339,384 is hereby incorporated by reference.

BACKGROUND

1. Field of the Invention

The present invention relates generally to the field of mounting automotive gauges and more particularly to an adjustable gauge mounting cup with interchangeable mounting pedestals that provide a maximum number of mounting locations within a vehicle.

2. Description of the Prior Art

Drivers of high performance cars such as race cars or other competition vehicles, or in some cases antique or specialty automobiles, need to monitor various engine and other parameters. This is accomplished through the use of gauges. Gauges can be used to read speed, RPM, oil pressure, fuel quantity, coolant temperature, voltage, fuel pressure, air to fuel ratio, and many other important parameters. Gauges are normally round with a typical size being around 2 1/16 inches in diameter. Other sizes such as 2 5/8 inches, 3 3/8 inches, and 5 inches can also be found.

A gauge normally has a round face with a cylinder shaped body. Cables or tubes attach to the back of the cylinder. The front of the gauge has a glass or plastic transparent face with an indicator scale and needle.

Gauges are typically mounted in apillar pods or cups. They can also be mounted as an instrument cluster on the dashboard. A cup is generally considered as a statement of style. A cup holds a single instrument. Prior art cups have a single attach point and are not easily adjustable. Generally they are attached to the vehicle with machine screws. Some cups are mounted so that they can be adjusted up and down; however, there is no way to put them into exactly the correct position for viewing after they are mounted.

What is badly needed is a gauge mounting cup that allows the operator to easily adjust the viewing angle of the gauge after the cup is mounted in the vehicle. This cup should also have replaceable mounts that have various types of mounting footprints and sizes.

SUMMARY OF THE INVENTION

The present invention relates to a gauge mounting cup that mounts on a ball and socket or other adjustable mounting means. This allows the cup to be swiveled on three axes after the base pedestal is mounted and also allows the cup to be moved forward and backward on the pedistal mount.

It is an object of the present invention to provide a gauge mounting cup that can be adjusted to any viewing angle after it is mounted.

It is an object of the present invention to allow adjustment of the cup forward and backward on a pedistal holder.

It is a further object of the present invention to provide a gauge mounting cup with interchangeable mounting pedestals.

It is a further object of the present invention to provide a gauge mounting cup with various types and sizes of pedistals so that it can be mounted in locations not allowed by curred fixed single mount designs.

It is a further object of the present invention to provide a low cost, one-piece version that could be manufactured by injection molding as well as a more expensive, two-piece model where the gauge holding tube could be removed.

The gauge cup of the present invention can hold a 2 1/16 inch or other standard gauge. It can be stamped from aluminum, formed from plastic or high-end composite material such as carbon fiber material or any other convenient material. It can be supplied in any color, and if aluminum, can be anodized. It can be sold as a separate unit to fit the taste of the customer.

It should be understood that the above mentioned figures are for purposes of illustrating the concepts of the invention. Many other designs and embodiments are included in the present invention.

DETAILED DESCRIPTION

Figure 1:
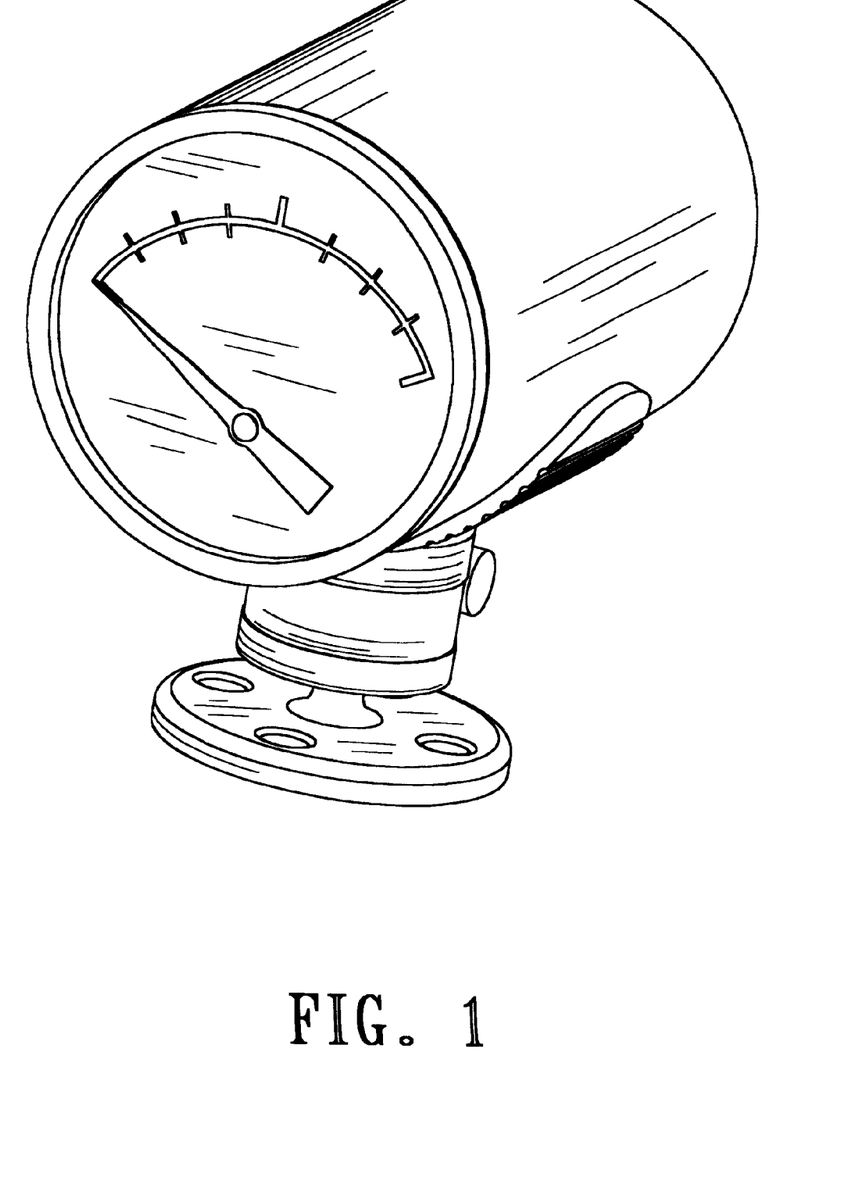
FIG. 1 shows a perspective view of an embodiment of the present invention.

FIG. 1 shows a front-on perspective view of a gauge mounted in an embodiment of the present invention. The gauge shown in FIG. 1 can be generic and can be any type of vehicle monitor gauge such as oil pressure, fuel quantity, etc. Also, the cup 1 can be generic and not car specific. FIG. 1 clearly shows a mounting cup on a base pedestal. The base of the pedestal can be round or any other convenient shape for easy mounting or style. The base can be made convenient for mounting in tight spaces. The guage can be mounted using 2-sided tape, VELCRO (VELCRO is a registered trademark), by being squeezed or clamped or by any other convenient mounting method.

Figure 2:
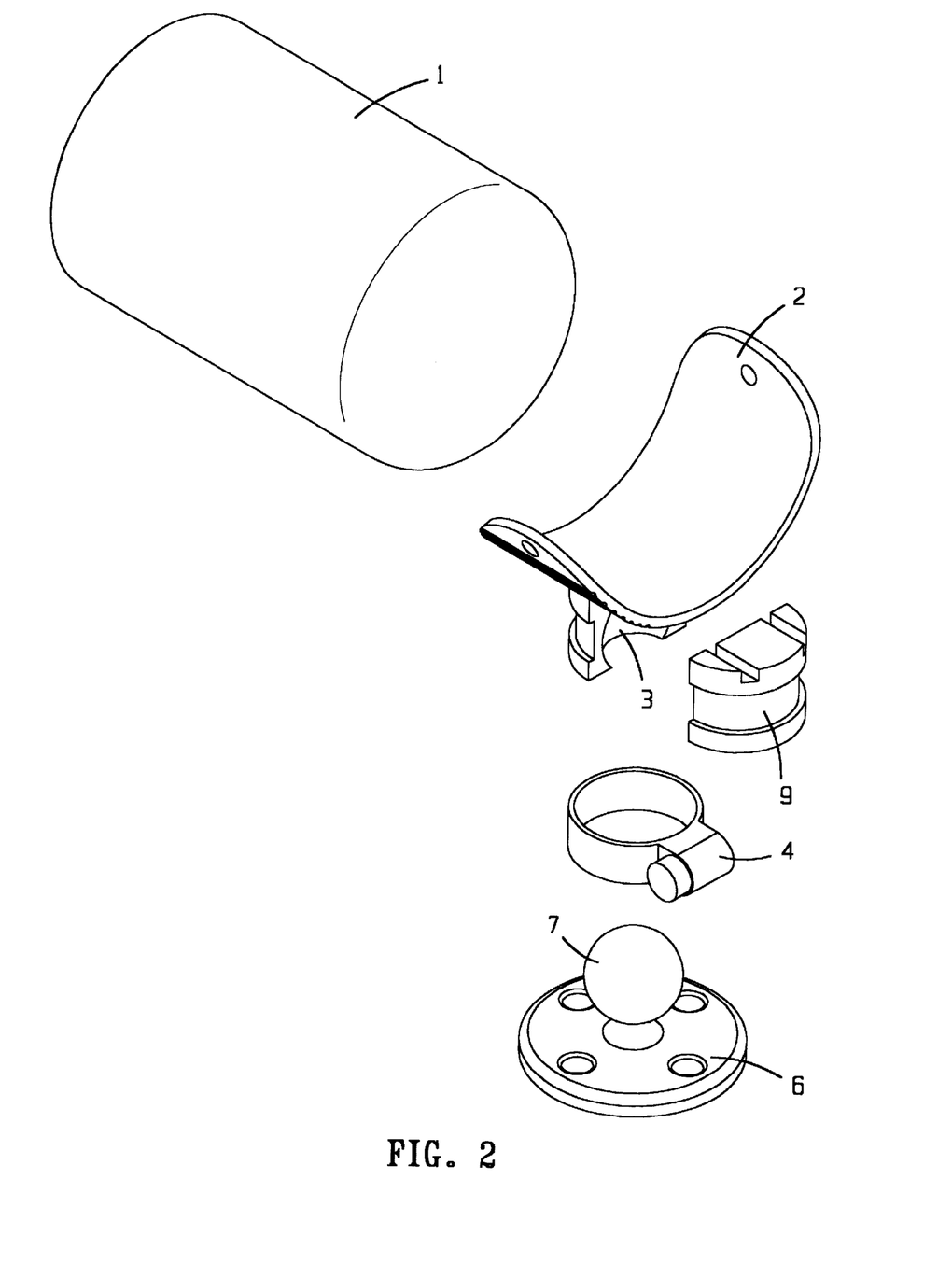
FIG. 2 shows an exploded perspective view of the embodiment from FIG. 1.

FIG. 2 is an exploded view of the embodiment of FIG. 1. A gauge cup 1 can be attached to a gauge holder 2 via double sided adhesive tape (not shown in FIG. 1) or VELCRO or attached by any other convenient means such as a ring, screw, or fastener. The guage holder 2 can contain one or more screw holes. A base pedestal 6 contains screw holes for convenient mounting to the A pillar of a vehicle. A mounting ball 7 is attached to the base pedestal 6. The ball 7 fits into a cavity 3 on a lower protrusion from the gauge holder 2. A back cover 9 is removable and completes the cavity 3 around the ball 7 when the device is mounted. An adjustable clamp 4 tightens around the back cover 9 and squeezes it tightly into contact with the ball 7. This allows the gauge to be swiveled along any axis so the user can position it for optimum viewing and preference. Because the mount is based on a ball, allows forward and backward adjustment. The clamp 4 can be of simple construction so that it can be easily loosened and tightened by the user for further adjustment. The ball and socket design allows at least a 45 degree front and back tilt and 360 degrees of rotation or more. The mounting pedestal can be interchangeable with several other types of pedestals. This interchangeability allows for hidden and non-hidden fastening means as well as tape mounting.

Figure 3:
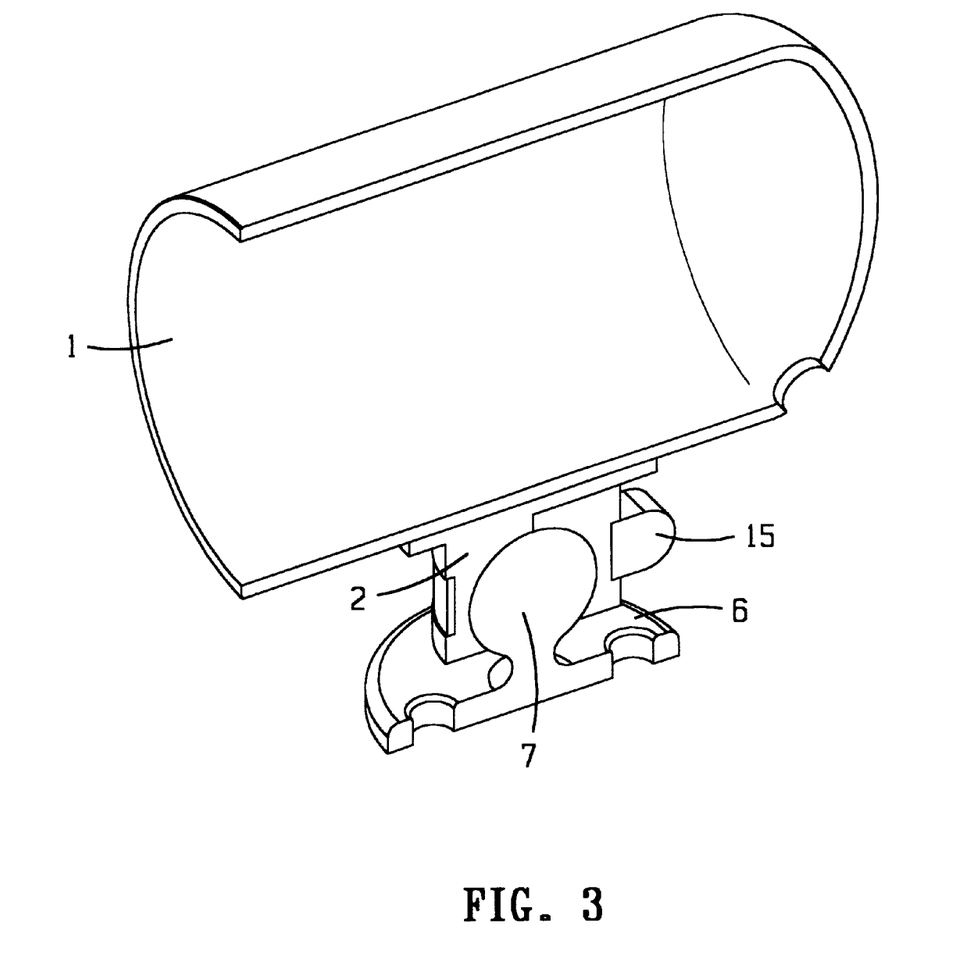
FIG. 3. shows a section of an embodiment with a ball mounting.

FIG. 3 shows a cross section of a slightly different ball mounted embodiment. The interior of the gauge cup 1 and the base 2 can be clearly seen. Again a ball 7 attached to a base pedestal 6 fits into the base 2 with a rear clamp 15. The clamp can be any type of clamp; however, a hose clamp design is preferred because it allows high clamping force without the danger of stripping. This model is totally universal and could be provided with a plurality of sizes of pedistal mounts and also several A pillar mounts.

Figure 4:
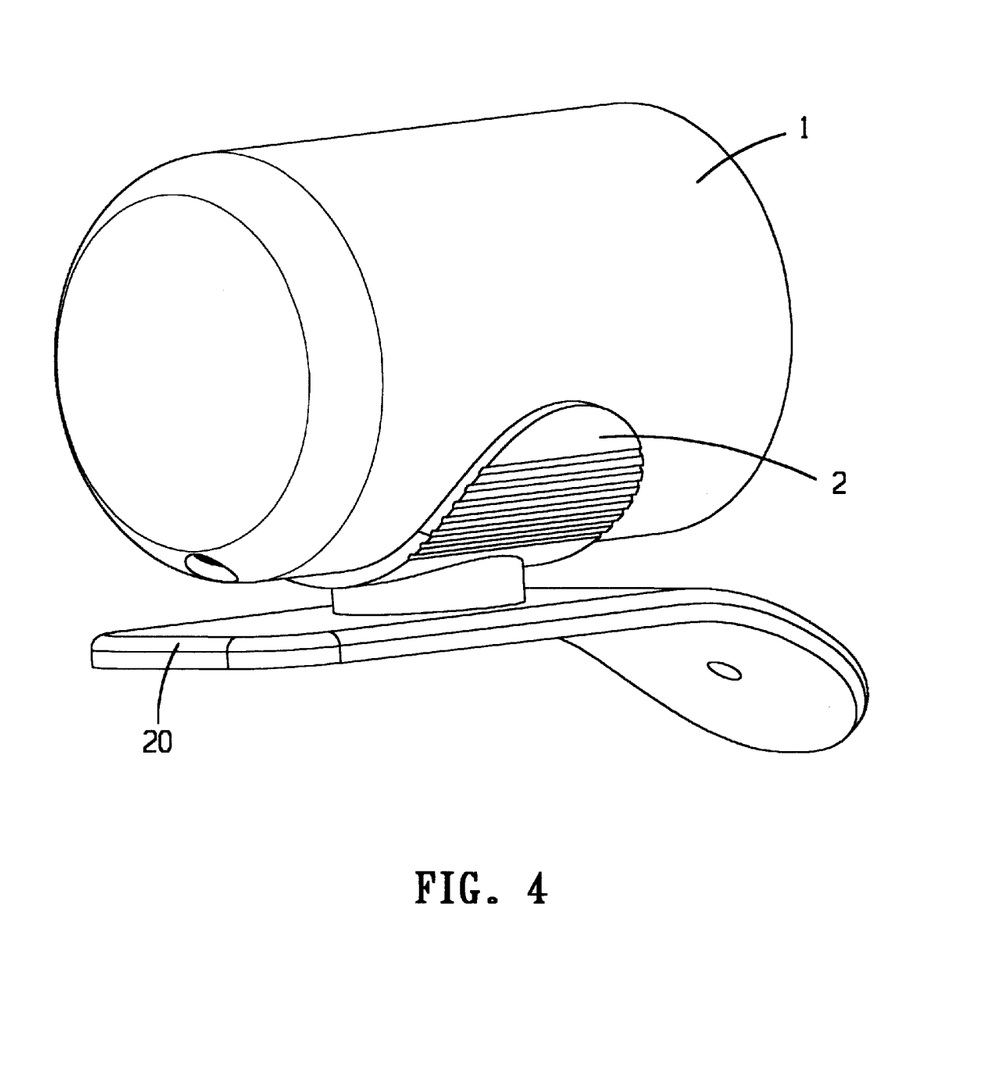
FIG. 4 shows an A pillar mounted embodiment of the invention in a back/side view.

FIG. 4 shows the cup 1 and gauge holder 2 from a bottom, rear view. In FIG. 4 a different embodiment is presented that can be directly mounted on a vehicle A pillar with screws. Here a base plate 20 fits the contour of an apillar. The base plate 20 is the only part that has to be changed to create a universal mount. The embodiment of FIG. 4 contains an A pillar cover and holder. The A pillar mount is generally car specific and must be sold tailored to various A pillar designs and shapes.

Figure 5:
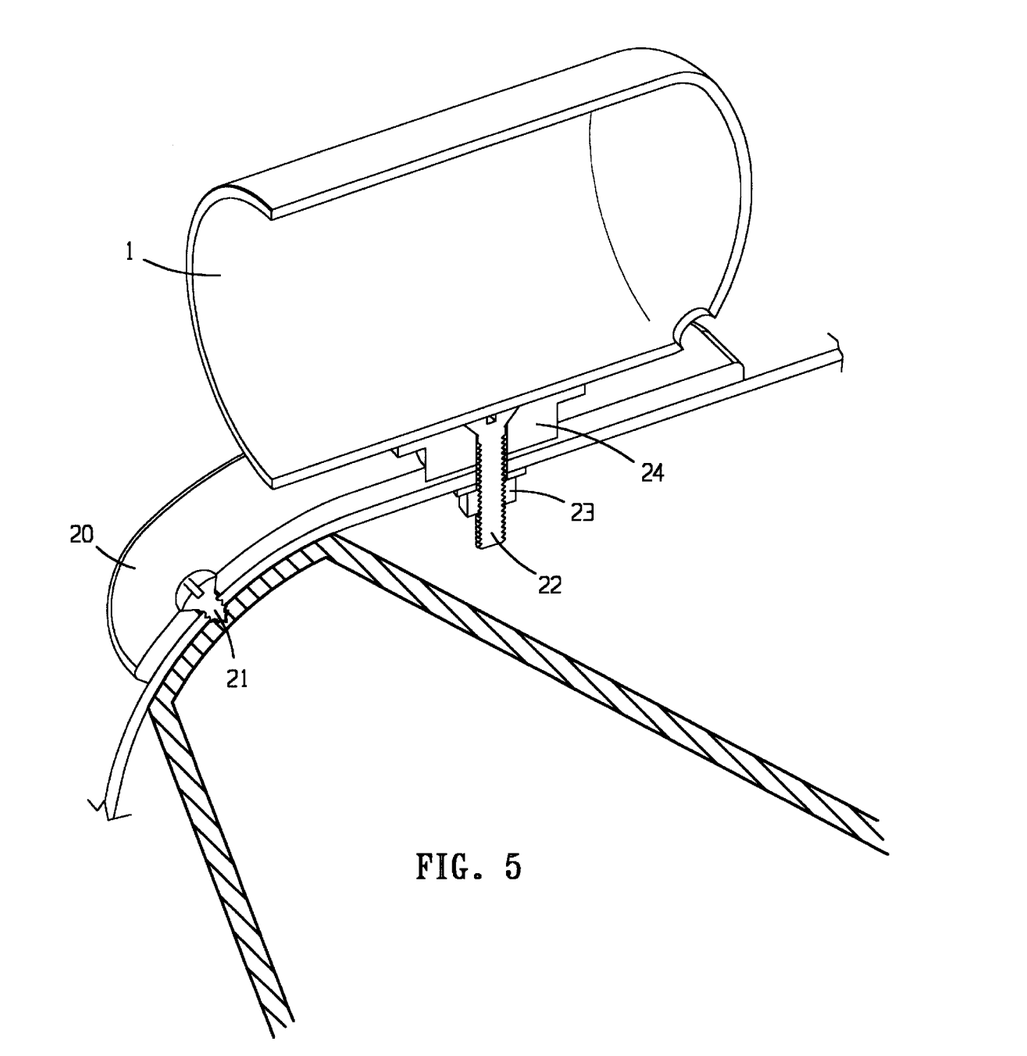
FIG. 5 shows a section of a screw mounted embodiment.

FIG. 5 shows a cross section of an A pillar cover 20 mounted embodiment. The gauge cup 1 can be mounted on a base 24 that takes a screw 22 that can penetrate the A pillar cover and be mounted to the cover with a mounting nut and washer 23. This arrangement allows the unit to turn 360 degrees to different viewing angles. The base 20 can be optionally secured to the A pillar cover with a sheet metal screw 21.

Figure 6A:
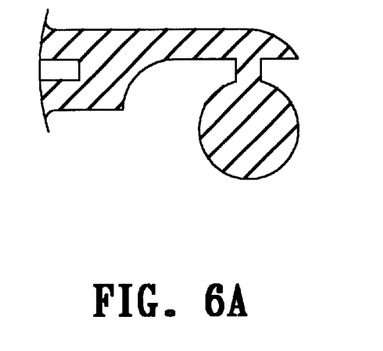
FIG. 6A shows a cross section of a ball mount.
Figure 6B:
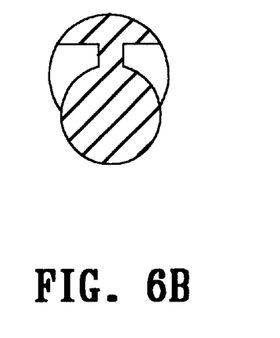
FIG. 6B shows an end view of the ball mount of FIG. 6A.
Figure 6C:
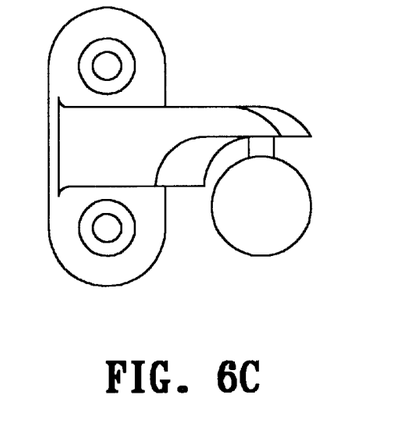
FIG. 6C shows a front view of a modified ball mount.
Figure 6D:
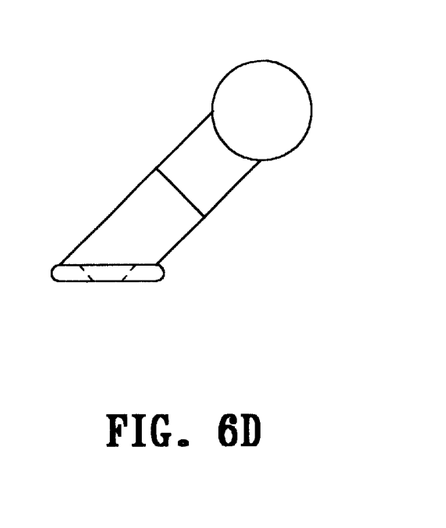
FIG. 6D shows an offset angled ball mount.
Figure 6E:
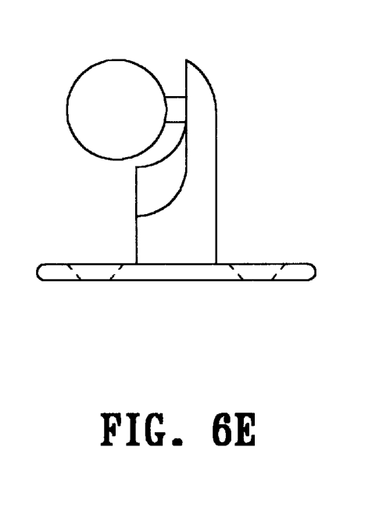
FIG. 6E shows variation of a ball mount.

FIGS. 6A–6E show variations on ball mount bases. FIG. 6A shows an embodiment with a threaded insert in its rear and a flat mounting face with no angle. FIG. 6B shows an end view of the embodiment of FIG. 6A. FIG. 6C shows a variation with an offset angle. Here the arm angles from the base at a convenient and pleasing angle. FIG. 6D shows another angled variation. FIG. 6E shows an upright mounted version.

Figure 7:
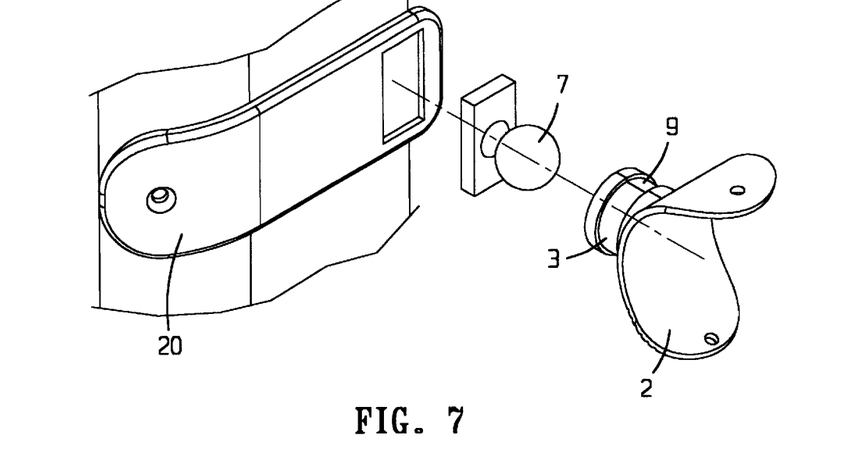
FIG. 7 shows an A pillar ball mount.
Figure 8:
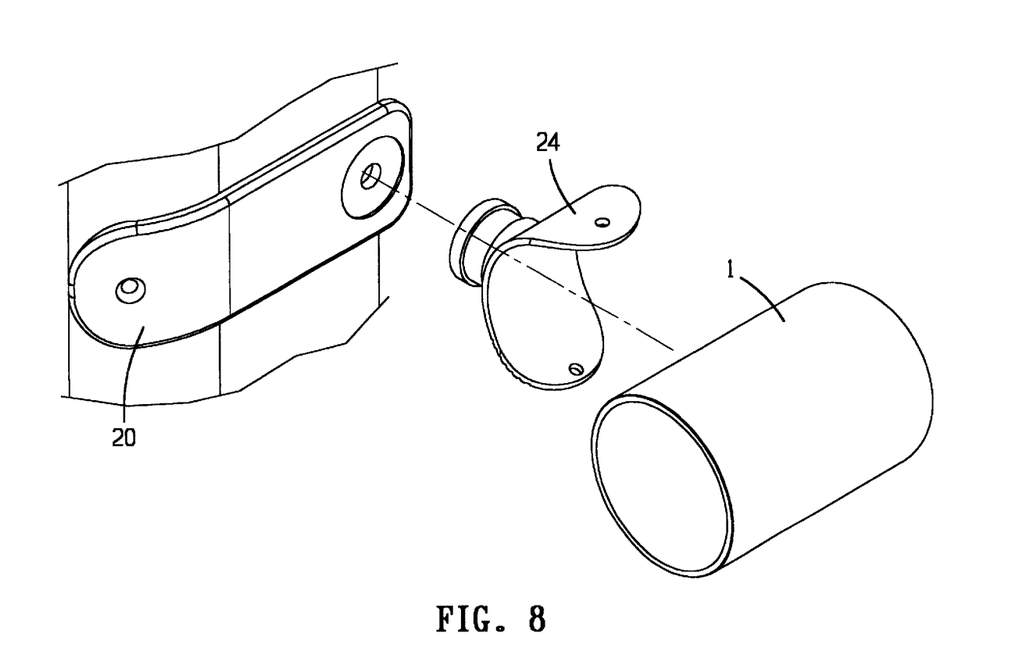
FIG. 8 shows an A pillar screw-on mount.

FIGS. 7 and 8 show A pillar mounted embodiments of the invention. A base 20 mounts on the A pillar cover and receives a ball mount 7 that fits into a cavity in 3 in the base of a guage holder 2. FIG. 8 shows a variation on this mount that does not contain a ball. This is an optional mount with the advantage that it does not stick out as far as the ball mounted embodiments and has a cleaner look.

Figure 9:
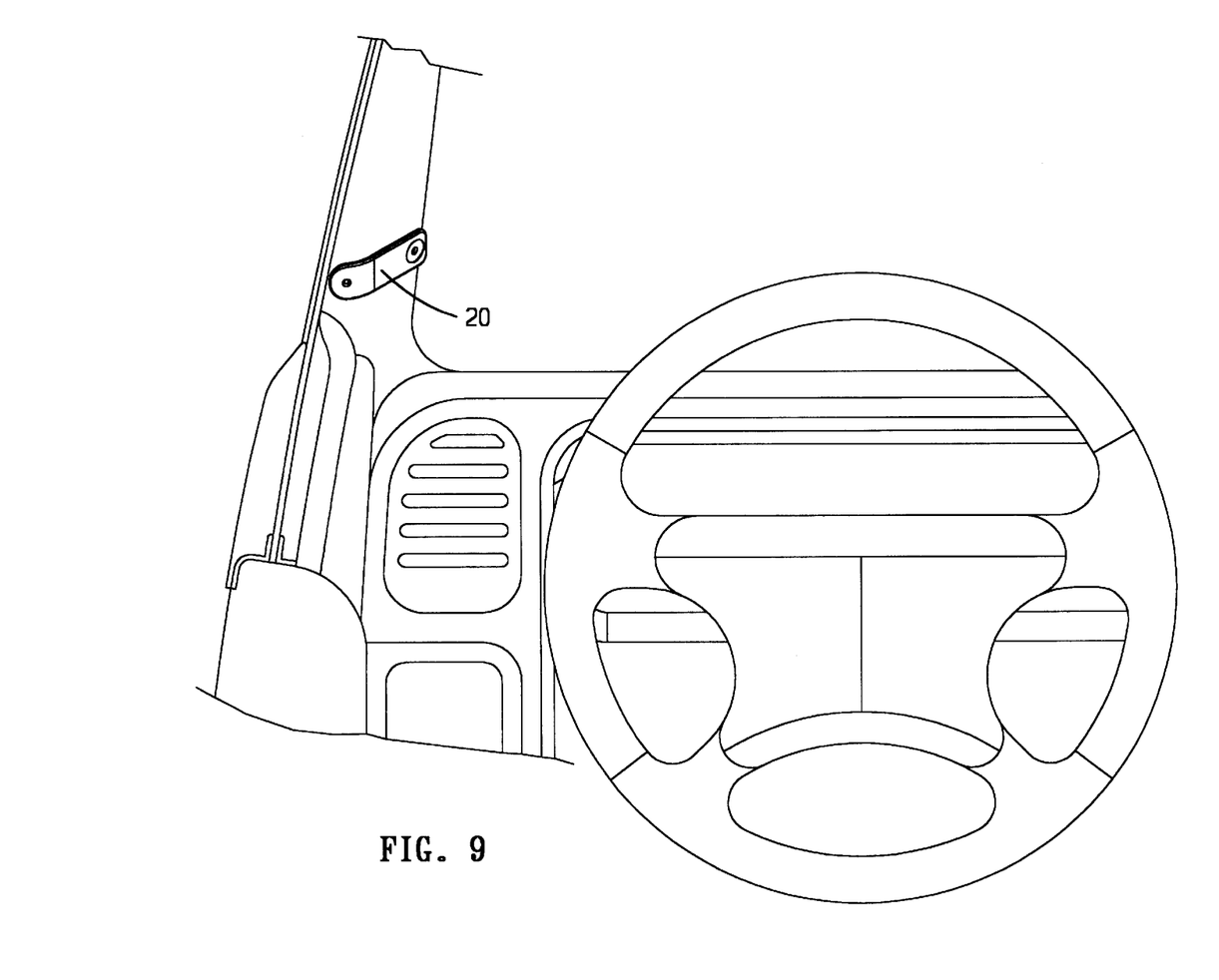
FIG. 9 shows an A pillar mounting bracket that can be used with the embodiment of FIG. 5.

FIG. 9 shows an A pillar mount inside a vehicle. A base plate is mounted on the A pillar cover. In this arragement, the actual mount can be adjusted back and forth and rotated up and down. A ball mount could also be used here.

Most embodiments of the present invention have some sort of hole in the rear of the gauge cup for instrument wiring or tubing to exit. Also, it should be understood that various embodiments of the present invention can be conveniently made to different standard and custom sizes and made of different materials.

It should be understood that the descriptions and embodiments herein presented are for the purpose of illustrating and explaining the present invention to one skilled in the art. Many design changes or differences and many other embodiments are within the scope of the present invention. The scope of the invention is determined by the claims and not by the written description.

I claim:

1. A gauge mounting cup of the type used on high performance vehicles comprising:
   a subtantially cylindrical cup-shaped container with an open and a closed end for holding an instrument gauge;
   a semicircular bracket attached to said cylindrical cup-shaped container, said bracket stabilizing said cup-shaped container;
   a ball and socket mounting assembly comprising a ball part attached to a base pedestal and a socket part attached to said semicircular bracket, said ball and socket mounting assembly allowing said cylindrical cup-shaped container to be swiveled on three axes allowing said instrument gauge to be viewed from any viewing angle;
   a clamping means communicating with said ball and socket mounting assembly for clamping said cylindrical cup-shaped container at a fixed viewing angle.

2. The gauge mounting cup of claim 1 wherein said base pedestal has a footprint smaller than 2 inches for mounting in tight spaces.

3. The gauge mounting cup of claim 1 wherein said ball part of said ball and socket pedestal is separable from said socket part.

4. The gauge mounting cup of claim 1 wherein said semi-circular bracket is attached to said substantially cylindrical cup-shaped container with double-sided adhesive tape.

5. The gauge mounting cup of claim 1 wherein said substantially cylindrical cup-shaped container is plastic.

6. The gauge mounting cup of claim 1 wherein said substantially cylindrical cup-shaped container is aluminum.

7. The gauge mounting cup of claim 1 wherein said substantially cylindrical cup-shaped container is carbon composite.

8. A gauge mounting cup of the type used on high performance vehicles comprising:
   a substantially cylindrical cup-shaped container with an open and a closed end for holding an instrument gauge;
   a curved bracket adapted to fit a vehicle A pillar cover;
   a base means attached to said substantially cylindrical cup-shaped container, said base means holding said cup-shaped container to said curved bracket;
   fastening means for fastening said curved bracket to said automobile A piller cover.

9. The gauge mounting cup of claim 8 wherein said fastening means comprises at least one screw.

10. The gauge mounting cup of claim 8 wherein said fastening means comprises at least one bolt.

11. The gauge mounting cup of claim 8 wherein said fastening means comprises at least one sheet metal screw and at least one bolt.

12. The gauge mounting cup of claim 8 wherein said substantially cylindrical cup-shaped structure is plastic.

13. The gauge mounting cup of claim 8 wherein said substantially cylindrical cup-shaped structure is aluminum.

14. The gauge mounting cup of claim 8 wherein said substantially cylindrical cup-shaped structure is carbon composite.

15. An vehicle instrument mounting system for mounting cylindrical instrument gauges in vehicles comprising, in combination:
   instrument holding means for holding a cylindrical instrument gauge in a position to be observed by a driver;
   base pedestal mounting means for mounting said instrument holding means to a vehicle A pillar cover;

swivel means attached to said base pedestal mounting means and to said instrument holding means for allowing said instrument holding means to swivel to any viewing position;

clamping means for clamping said swivel means to a fixed viewing angle;

whereby said instrument holding means is swiveled on 3 axes by said driver to a desired viewing angle and then clamped to said viewing angle by said clamping means, said instrument means being later adjustable to any other viewing angle by releasing said clamping means, adjusting said instrument holding means to said other viewing angle, and reclamping said clamping means to hold said instrument holding means at said other viewing angle.

16. A system for mounting a 2 1/16 gauge on a vehicle A pillar comprising a hollow cup-shaped container molded from plastic or stamped from aluminum, said cup-shaped container being of color selectable by a purchaser, said cup-shaped container attached to a gauge cup holder by doubled-sided adhesive tape or VELCRO, said adhesive tape or VELCRO allowing front-to-back adjustment of said mounting system, said gauge cup holder containing a lower partially-spherical socket, said socket mounting with a spherical ball attached to a round or rectangular flat base plate, said base plate being attached to said vehicle dashboard with a fastener means.

17. The system for mounting of claim 16 wherein said fastener means contains at least one sheet metal screw.

18. The system for mounting of claim 16 wherein said cup-shaped container is metal.

19. The system for mounting of claim 16 wherein said cup-shaped container is plastic.

20. The system for mounting of claim 18 wherein said cup-shaped container is aluminum.

* * * * *